US006855461B2

(12) United States Patent
Lampe-Onnerud et al.

(10) Patent No.: US 6,855,461 B2
(45) Date of Patent: Feb. 15, 2005

(54) CATHODE MATERIAL FOR LITHIUM RECHARGEABLE BATTERIES

(75) Inventors: Christina Lampe-Onnerud, Framingham, MA (US); Per Onnerud, Framingham, MA (US); Dmitri Novikov, Wellesley, MA (US); Jie Shi, Acton, MA (US); Richard Chamberlain, Boston, MA (US); Tomoyoshi Koizumi, Iwaki (JP); Aisaku Nagai, Iwaki (JP)

(73) Assignee: Kureha Chemical Industry Co., Ltd. (JP)

( * ) Notice: Subject to any disclaimer, the term of this patent is extended or adjusted under 35 U.S.C. 154(b) by 235 days.

(21) Appl. No.: 10/073,678

(22) Filed: Feb. 11, 2002

(65) Prior Publication Data

US 2002/0192556 A1 Dec. 19, 2002

Related U.S. Application Data

(60) Provisional application No. 60/298,791, filed on Jun. 15, 2001, and provisional application No. 60/298,798, filed on Jun. 15, 2001.

(51) Int. Cl.[7] .............................................. H01M 4/58
(52) U.S. Cl. ................................. 429/231.1; 429/231.2; 429/231.3; 429/231.5; 429/231.6; 429/223; 429/224; 429/231.95; 429/217; 429/232
(58) Field of Search .......................... 429/231.1, 231.5, 429/231.3, 224, 231.6, 217, 232, 231.95, 223, 231.2

(56) References Cited

U.S. PATENT DOCUMENTS 5,679,481 A * 10/1997 Takanishi et al. ............ 429/223
6,017,654 A * 1/2000 Kumta et al. ................ 429/223
6,274,272 B1 * 8/2001 Peres et al. ............... 429/231.1

FOREIGN PATENT DOCUMENTS

| EP | 0 993 057 A1 | 4/2000 |
|----|--------------|--------|
| JP | 2797693 | 6/1992 |
| JP | 06-275275 | 9/1994 |
| JP | 07-235292 | 9/1995 |
| JP | 08-138669 | 5/1996 |

(List continued on next page.)

OTHER PUBLICATIONS

Chowdari, B.V.R. et al., "Cathodic behavior of (Co, Ti, Mg)–doped $LiNiO_2$," Solid State Ionics, 140:55–62 (2001).

(List continued on next page.)

Primary Examiner—Laura Weiner
(74) Attorney, Agent, or Firm—Hamilton, Brook, Smith & Reynolds, P.C.

(57) ABSTRACT

A crystal which can be employed as the active material of a lithium-based battery has an empirical formula of $Li_{x1}A_2Ni_{1-y-z}Co_yB_zO_a$, wherein "x1" is greater than about 0.1 and equal to or less than about 1.3, "x2," "y" and "z" each is greater than about 0.0 and equal to or less than about 0.2, "a" is greater than about 1.5 and less than about 2.1, "A" is at least one element selected from the group consisting of barium, magnesium, calcium and strontium and "B" is at least one element selected from the group consisting of boron, aluminum, gallium, manganese, titanium, vanadium and zirconium. A method includes combining lithium, nickel, cobalt and at least one element "A" selected from the group consisting of barium, magnesium, calcium and strontium, has at least one element "B" selected from the group consisting of boron, aluminum, gallium, manganese, titanium, vanadium and zirconium, in the presence of oxygen, wherein the combined components have the relative ratio of $Li_{x1}:A_{x2}:Ni_{1-y-z}:Co_y:B_z$, wherein "x1," "x2," "y" and "z" have the values given for the empirical formula shown above.

9 Claims, 9 Drawing Sheets

FOREIGN PATENT DOCUMENTS

| | | |
|---|---|---|
| JP | 08-315819 | 11/1996 |
| JP | 09-17430 | 1/1997 |
| JP | 09-50810 | 2/1997 |
| JP | 09-55210 | 2/1997 |
| JP | 10208743 | 8/1998 |
| JP | 10-236826 | 9/1998 |
| JP | 10241691 | 9/1998 |
| JP | 11040153 | 2/1999 |
| JP | 11-67209 A | 3/1999 |
| JP | 11092149 | 4/1999 |
| JP | 11-195416 | 7/1999 |
| JP | 2000-149950 A | 5/2000 |
| JP | 2000-195517 A | 7/2000 |
| JP | 2001-143708 | 5/2001 |

OTHER PUBLICATIONS

Sun, X. et al., "Studies On Relationship Between Structure of Over–Charge State and Thermal Stability for $LiNiO_2$ Based Cathode Materials," *Electrochemical Society Proceedings*, 99 (25):268–277 XP008024185 (2000).

* cited by examiner

Figure 4A low charge density high charge density low charge density

A=Commercial Product $LiCoO_2$
B= Patent Example $Li_{1.05}Mg_{0.05}Ni_{0.85}Co_{0.10}Mn_{0.05}O_2$
C=Commercial Product $LiNi_{0.8}Co_{0.2}O_2$

CATHODE MATERIAL FOR LITHIUM RECHARGEABLE BATTERIES

RELATED APPLICATION

This application claims the benefit of U.S. Provisional Application Nos. 60/298,791 and 60/298,798, both of which were filed on Jun. 15, 2001. The entire teachings of both applications are incorporated herein by reference.

BACKGROUND OF THE INVENTION

Lithium-based batteries are used in a variety of applications, such as videotape recorders, communication devices and many portable devices. Traditionally, the lithium battery industry has employed $LiCoO_2$-type materials as the active component of lithium battery cathodes. However, $LiCoO_2$ lithium battery cathodes typically are expensive and exhibit relatively low capacity.

One alternative to the use of $LiCoO_2$-based cathode materials is $LiNiO_2$-based materials, which generally are less expensive, but often exhibit higher specific capacity. Typically, $LiNiO_2$-based materials employed in lithium battery cathodes have a lithium content of about 80% and a cobalt content of about 20% (atomic weight percent). However, $LiNiO_2$-based materials generally are less safe (i.e. exhibit more gassing) than are $LiCoO_2$-type materials. Further, $LiNiO_2$-based materials exhibit a first cycle efficiency that often is between about five and ten percent lower than that of $LiCoO_2$-based cathodes. Generally, $LiCoO_2$-based materials have efficiencies in a range of between about 93% and about 95%, whereas $LiNiO_2$-based materials have efficiencies that range from between about 83% to about 88%.

Other cathode materials known in the art include, for example, those having a chemical formula $Li_{1-x}A_x Ni_{1-y}B_yO_2$, wherein "A" represents and alkali or alkaline earth metal element, and "B" represents at least one transition metal. It is believed that cathode materials having this composition often exhibit little or no improvement over more traditional materials.

Therefore, a need exists for cathode materials suitable for use in lithium-based batteries that minimize or overcome the above-referenced problems.

SUMMARY OF THE INVENTION

The invention generally is directed to a composition and a method of forming a composition, wherein the composition is suitable for employment in a cathode of a lithium battery. The invention also is directed to a lithium battery that employs a cathode material of the invention.

In one embodiment, the invention is a composition having a crystal, wherein the crystal has an empirical formula $Li_{x1}A_{x2}Ni_{1-y-z}Co_yB_zO_a$. "x1" is greater than about 0.1 and equal to or less than about 1.3, "x2" is greater than about 0.0 and equal to or less than about 0.2, "y" is greater than about 0.0 and equal to or less than about 0.2, "a" is greater than about 1.5 and less than about 2.1. "A" is at least one element selected from the group consisting of barium, magnesium, calcium and strontium. "B" is at least one element selected from the group consisting of boron, aluminum, gallium, manganese, titanium, vanadium and zirconium.

In another embodiment, the invention is directed to a method of forming a composition, comprising the step of combining lithium, nickel, cobalt, at least one element "A" selected from the group consisting of barium, magnesium, calcium and strontium, and at least one element "B" selected from the group consisting of boron, aluminum, gallium, manganese, titanium, vanadium and zirconium, in the presence of oxygen. The components are combined in a relative ratio of $Li_{x1}:A_{x2}:Ni_{1-y-z}:Co_y:B_z$, wherein "x1" is greater than about 0.1 and equal to or less than about 1.3, and "x2," "y" and "z" each is greater than about 0.0 and equal to or less than about 0.2. The combination is heated to a crystallization temperature in a range of between about 400° C. and about 950° C. for a period of time that causes the elements to form a crystal structure.

In another embodiment, the invention is a lithium battery that includes a cathode having a composition with the empirical formula $Li_{x1}A_{x2}Ni_{1-y-z}Co_yB_zO_a$, wherein "x1" is greater than about 0.1 and equal to or less than about 1.3, "x2," "y" and "z" each is greater than about 0.0 and equal to or less than about 0.2, "a" is greater than about 1.5 and less than about 2.1, "A" is at least one element selected from the group consisting of barium, magnesium, calcium and strontium, and "B" is at least one element selected from the group consisting on aluminum, gallium, manganese, titanium, vanadium and zirconium.

In still another embodiment, the invention is a cathode having a composition of the empirical formula $Li_{x1}A_{x2}Ni_{1-y-z}Co_yB_zO_a$, wherein "x1" is greater than about 0.1 and equal to or less than about 1.3, "x2," "y" and "z" each is greater than about 0.0 and equal to or less than about 0.2, "a" is greater than about 1.5 and less than about 2.1, "A" is at least one element selected from the group consisting of barium, magnesium, calcium and strontium, and "B" is at least one element selected from the group consisting on aluminum, gallium, manganese, titanium, vanadium and zirconium.

In yet another embodiment, the invention is a composition, formed by a method that includes the step of combining lithium, nickel, cobalt, at least one element "A" selected from the group consisting of barium, magnesium, calcium and strontium, and at least one element "B" selected from the group consisting of boron, aluminum, gallium, manganese, titanium, vanadium and zirconium, in the presence of oxygen. The components are combined in a relative ratio of $Li_{x1}:A_{x2}:Ni_{1-y-z}:Co_y:B_z$, wherein "x1" is greater than about 0.1 and equal to or less than about 1.3, and "x2," "y" and "z" each is greater than about 0.0 and equal to or less than about 0.2. The combined components are heated to a crystallization temperature in a range of between about 400° C. and about 950° C. for a period of time that causes the elements to form a crystal structure.

The compositions of the claimed invention generally will exhibit improved capacity, cyclability and safety over $LiCoO_2$ and $LiNiO_2$ counterparts. Further, these compositions typically are less expensive to manufacture than $LiCoO_2$-based materials, due to the decreased content of cobalt. Also, the capacity, cyclability and safety of materials employed as cathodes is manipulated by employing particular combinations of dopants to substitute for lithium and nickel in the crystal lattice of the composition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The above features and other details of the invention now will be described more particularly with reference to the accompanying drawings and pointed out in the claims. It will be understood that the particular embodiments of the invention are shown by way of illustration and not as limitations of the invention. The principal features of this invention can be employed in various embodiments without departing from the scope of the invention.

The present invention generally is directed to a composition, or crystal, having the following empirical formula: $Li_{x1}A_{x2}Ni_{1-y-z}Co_yB_zO_a$. The crystal structure is of an "α-NaFeO$_2$-type" and can be characterized as having a hexagonal lattice within the R-3 m group. The composition of the invention is suitable for employment as the active material in cathodes for rechargeable lithium-ion or lithium polymer-type batteries, among other uses. The invention also generally is directed to lithium batteries, to cathodes of lithium batteries that employ the composition of the invention, and to methods of forming the composition.

In one embodiment, the invention is a crystal having an empirical formula: $Li_{x1}A_{x2}Ni_{1-y-z}Co_yB_zO_a$, wherein "x1" is greater than about 0.1 and equal to or less than about 1.3, "x2," "y" and "z" each is greater than about 0.0 and equal to or less than about 0.2, and "a" is greater than about 1.5 and less than about 2.1. "A" is at least one element selected from the group consisting of barium (Ba), magnesium (Mg), calcium (Ca) and strontium (Sr), and "B" is at least one element selected from the group consisting of boron (B), aluminum (Al), gallium (Ga), manganese (Mn), titanium (Ti), vanadium (V) and zirconium (Zr). In one preferred embodiment, "A" is magnesium and "B" is aluminum. In another preferred embodiment, "A" is magnesium and "B" is manganese. In still another embodiment, "A" is magnesium and "B" is gallium.

A method of the invention includes the step of combining lithium (Li), nickel (Ni), cobalt (Co), and at least one element "A" selected from the group consisting of barium, magnesium, calcium and strontium, and at least one element "B" selected from the group consisting of boron, aluminum, gallium, manganese, titanium, vanadium and zirconium, in the presence of oxygen (O). The combination has a relative ratio of $Li_{x1}:A_{x2}:Ni_{1-y-z}:Co_y:B_z$ wherein "x1" is greater than about 0.1 and equal to or less than about 1.3, "x2," "y" and "z" each is greater than about 0.0 and equal to or less than about 0.2. Lithium can be added to the combination as a suitable compound, such as $LiNO_3$, $LiCO_3$, or 2: OH. Other components of the combination can be added in the form of their respective hydroxides or oxides. For example, "A," nickel (Ni) and cobalt (Co) can be added as dihydroxides, and "B" can be added as an oxide.

The combination is heated to a crystallization temperature. A "crystallization temperature" as defined herein is a temperature which the combination will form an "α-NaFeO$_2$"-type crystal structure. The combination is maintained at a crystallization temperature for a period of time sufficient to cause the elements to form a crystal structure, an α-NaFeO$_2$-type crystal structure. In one embodiment, the combination is heated to a temperature in a range of between about 400° C. and about 950° C. In a specific embodiment, the combination is maintained at a temperature of between 400° C. and 950° C. for a period of time in a range of between about 0.5 and about 6 hours.

In one embodiment, the combination is maintained at a crystallization temperature in an oxidizing atmosphere, such as an atmosphere that includes at least one element selected from the group consisting of $O_2$ and $CO_2$ In another embodiment, the combination is heated to the crystallization temperature in a inert reducing atmosphere, such as an atmosphere that includes at least one element selected from the group consisting of argon and nitrogen. Typically, the combination is heated to the crystallization temperature in an atmosphere that has an absolute pressure in a range of between about 0.5 and about 2 atmospheres.

In a specific embodiment, the combination is heated to a first crystallization temperature by ramping of the temperature of the combination at a rate in a range of between about 10° C. per minute and about 40° C. per minute. The first crystallization temperature can be in a range of between about 300° C. and about 450° C., and the combination is maintained at the first crystallization temperature for a period of time in a range of between about 0.2 hours and about 4 hours. The combination then can be heated to a second crystallization temperature at a rate in a range of between about 5° C. per minute and about 20° C. per minute to a temperature in a range of between about 600° C. and about 1000° C. The combination then is held at the second crystallization temperature for a period of time in a range of between about 0.5 hours and about 6 hours.

In another embodiment, the invention is a composition, such as a crystal, or a cathode formed by the method of the invention. A lithium-based battery example of the invention, such as a lithium ion battery, a lithium polymer battery, or a lithium battery, is shown partly in cross-section in FIG. 1. Many various batteries are possible and this particular description serves as an example. As shown therein, lithium-based battery 10 includes case 12. Case 12 is formed of a suitable material, such as stainless steel. Insulator 14 is located at a bottom portion of case 12. Electrode group 16 includes cathode 18, separator 20, and anode 22. Anode 22 also is an embodiment of the invention. Insulating seal plate 24 at an upper opening of case 12 is fixed to case 12 by a suitable method, such as by caulking. Cathode terminal 26 at a central portion of insulating seal plate 24 is connected electrically to cathode lead 28. Cathode lead 28, in turn, is connected electrically to cathode 18 of electrode group 16. Anode 22 of electrode group 16 is connected electrically to case 12 as an anode terminal, via a negative electrode lead (not shown). Lithium-based battery 10 includes several electrode groups, all of which have the same construction.

Figure 1:
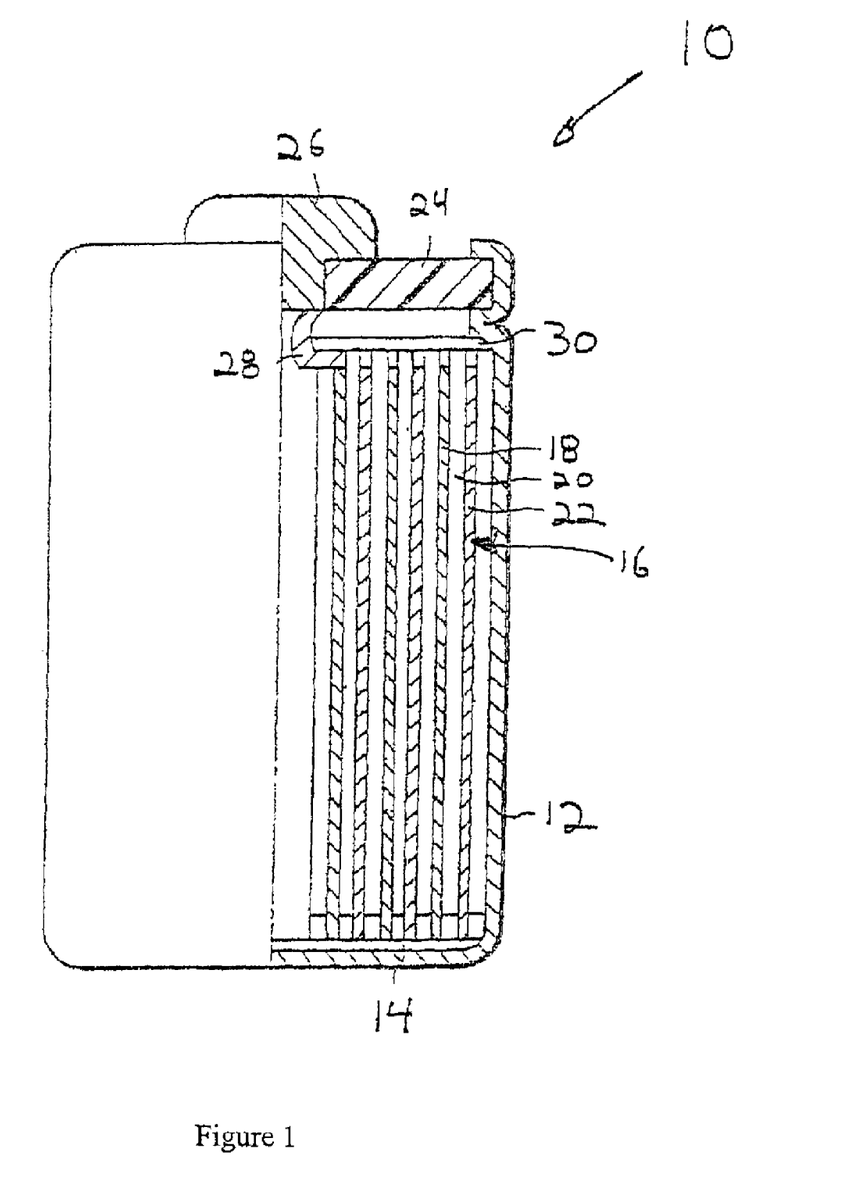
FIG. 1 is a cross section view of a lithium-based battery of the invention and a cathode of the invention.

Insulator 30 is located above electrode group 16 and has a central opening.

Cathode 18 of the invention includes a composition of the invention as an active material. Cathode 18 also includes a suitable conductive agent, such as acetylene black, carbon black and graphite. A binder, such as polytetrafluoroethylene (PTFE), polyvinylidene fluoride (PVDF), ethylenepropylene-diene copolymer (EPDM) in styrene-butadiene rubber (SBR) also is included in cathode 18. The ratios of active material, conductive agent and binder can be, for example, about 85 to about 98 weight percent of the active material, about 1 to about 5 weight percent of the conductive agent, and about 1 to about 10 weight percent of the binder. The mixed active material, conductive agent and binder are suspended in an appropriate solvent and then coated onto a suitable collector. Examples of a suitable collector is aluminum foil. The composition then is dried to form a thin plate on the collector.

Separator 20 includes a suitable polymer, such as a synthetic resin non-woven fabric, a polyethylene porous film, PVDF porous film or a polypropylene porous film, or a suitable glass fiber. Materials suitable for use as separator 20 in a lithium ion battery are well-known in the art. Examples of suitable positive electrodes are described in EP 0 688 057 B1, EP 0 573 266 A1, EP 0 763 865 A1, the teachings all of which are incorporated herein by reference in their entirety.

Anode 22 includes a coating on a collector. An example of a suitable collector is copper foil. The coating includes a polymer component, carbon graphite or hard carbon and an additive. The polymer binder component is a suitable material, such as polyvinylidene fluoride (PVDF), polyamide (PI) and polyvinylidene fluoride-hexafluoropropylene (PVDF-HFP). The polymer binder typically is present in the coating in an amount in a range of between about 1 and about 10 weight percent.

A suitable additive is carbon black or graphite flakes, which are well known in the art. An example of a suitable amount of additive in a coating is in a range of between about 0.5 and about 7 percent by weight.

Although not wishing to be bound by any particular theory, the crystal structure of compositions of the invention are believed to be of "α-NaFeO$_2$-type," and includes a hexagonal lattice within a "R-3m" space group. In this structure, Li and "A" atoms occupy the so-called "3a" site in the structure (x=0, y=0, and z=0), the Ni and "B" atoms occupy the "3b" site (x=0, y=0, Z=0.5), and oxygen occupies the "6c" site (x=0, y=0, z=z). The "z" coordinate of oxygen changes depending on the nature of "A" and "B" elements and their relative ratios. Typically, the "z" coordinate is between 0.22 and 0.26. The cell parameters of this material, "a" and "c," also varies with the chemical composition. Typically, cell parameters are found between the following ranges: a=2.75–2.95 Å, and c=13.9–14.3 Å.

The cathode materials of the current invention can improve the safety of Ni-based materials at the same time as capacity is maintained or improved, although the Ni-atoms are diluted. It is believed that this is made possible by simultaneous substitution of atoms in both the Li-site (3a-site) and the Ni-site (3b site). "A" atoms partly substitute for Li atoms in the 3a site. "B" atoms substitute for Ni in the 3b site. Further, it is believed that the capacity and cyclability is higher due to higher stabilization of the structure than that found in the LiCoO$_2$ system. This means that more lithium can be removed from the structure without having a structural collapse. It is believed that safety is high compared to LiNiO$_2$ due to shielding of the 3b—3b interaction, which is the dominating mode for structural collapse. This enables less structure damage upon cycling and higher stability at the lower Li contents at about x=0.2, which is the traditional cut-off for the LiNiO$_2$ systems, especially for compounds containing about 20% Co. Polarization behavior of the composition of the invention can lead to higher capacity for devices that utilize a 3.5 volt cut-off.

Characteristics of the cathode materials of the invention relate to capacity, cyclability, and safety. For example, compositions of the invention can exhibit different capacities depending on the charge/discharge rate and other external conditions, such as electrolyte choice and electrode formulation. "Capacity" is defined herein as the number of Li ions that can reversibly be removed from the crystal structures of lithium-based materials, such as those of the invention. "Reversibility," as defined herein, means that the structure substantially maintains its integrity and that Li can be intercalated back to restore the initial crystal structure. In theory, this is the definition of capacity at an infinitely small rate.

"Safety," as defined herein, means structural stability or structural integrity; if a material decomposes during cycling or is easily decomposed or causes gassing at elevated temperatures, the material is considered unsafe. Polarization behavior adds yet another dimension to capacity. Materials having a high voltage profile generally will have improved capacity, especially when discharge ends at 3.5 V, which is a technology constraint for many semiconductive electronic circuits. This is the case for cellular phones, for example, wherein typically one lithium battery cell is used, but less of a concern for other devices, such as laptop computers, that utilize multiple batteries.

Based on the lithium content, capacities of both LiCoO$_2$ and LiNiO$_2$ should be just about equal, since they contain the same amount of Li ions. Practically, this is not the case. LiCoO$_2$ material typically allows only about 50% Li extraction, while in LiNiO$_2$, one can reversibly remove about 80% of Li ions. After this critical amount of Li is removed, the crystal structure of a metal oxide irreversibly changes, i.e. a structural collapse takes place. The structural collapse is not preferred in a Li-ion battery as it contributes to capacity degradation and lower cyclability. The overcharge is also a safety concern.

Figure 2:
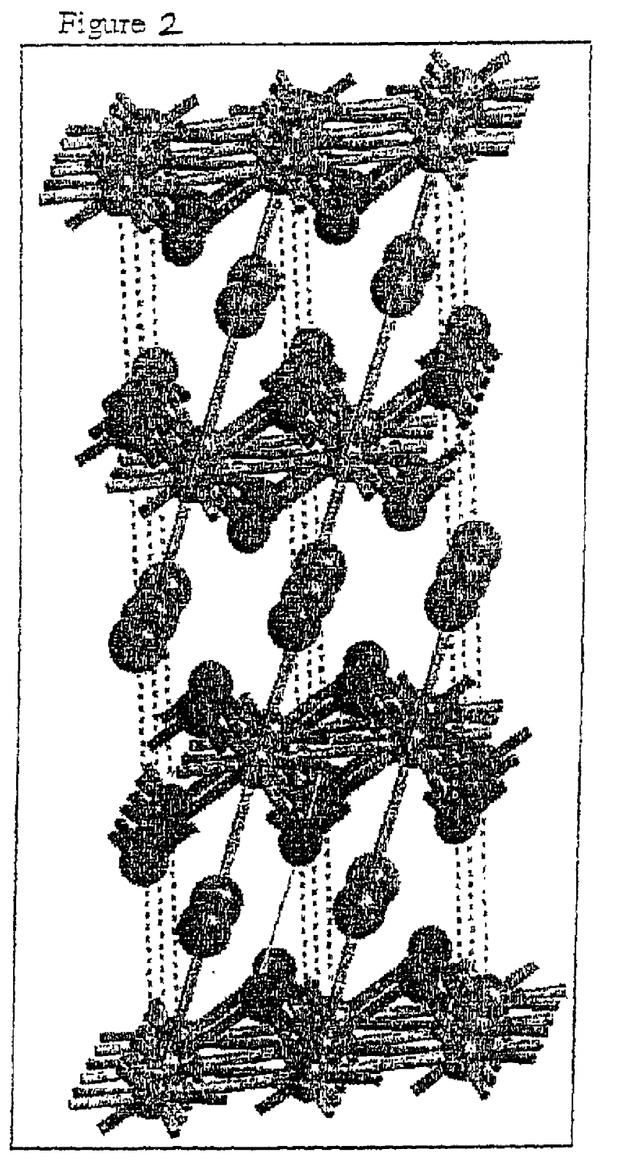
FIG. 2 is a three dimensional representation of the crystal structure of the invention.
Figure 3:
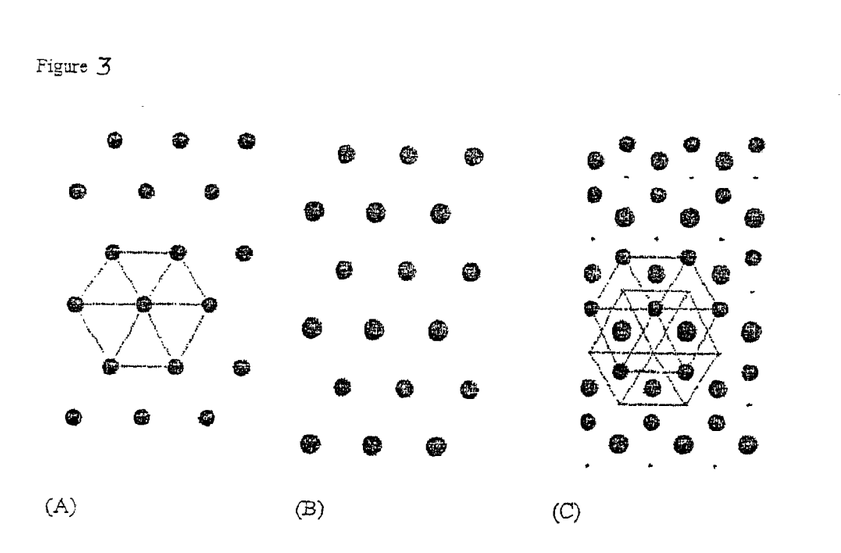
FIGS. 3A through 3C are representations of oxygen, metal and combined oxygen and metal planes in a crystal structure having the empirical formula $LiMO_2$, projected along the (012) plane.

The structural reason for this collapse is described below. The crystal structure of layered LiMO$_2$ is shown in FIG. 2. Intuitively, it is not obvious that the crystal if FIG. 2 will collapse, i.e. drastically reduce the distance between the MO$_2$ layers, when Li ions are removed from the structure. One would expect that the negatively charged neighbors (oxygen atoms) repel after the positively charged ions are removed. This should cause quite an opposite effect; the crystal should expand. However, this is shown not to be the case. Instead it is instructive to look at in the (012) family of crystallographic planes in the LiMO$_2$ structure, which are shown in FIG. 2. The sequence of these planes is depicted in FIG. 3. The crystal consists of alternating slightly distorted hexagonal metal/oxygen layers. The metal layer consists of both Li and M (Co/Ni/B) atoms, while the oxygen layer contains only oxygen atoms. This view of the structure helps to understand why the crystal is not repelling when the Li-ion layers are removed even in a simplistic ionic model. In fact, as seen from FIG. 3, when the Li atoms are removed from the structure, M-atoms still remain in the metal plane and keep the structure stable.

The crystal is kept together by interaction of oxygen and metal planes. The metal planes consist of alternating rows of Li/A and Ni/Co/B atoms. When Li atoms are removed, the metal plane becomes partially depopulated, which should result in an overall decease in structural stability. Another conclusion that we have drawn simply from structural considerations is that, when Li is removed, it leaves behind a quasi 1-dimensional string of M(Ni,Co,B) atoms in the (012) plane which should be thermodynamically less stable and thus should have a strong tendency to diffuse into sites that were formerly occupied by Li atoms.

Figure 4A:
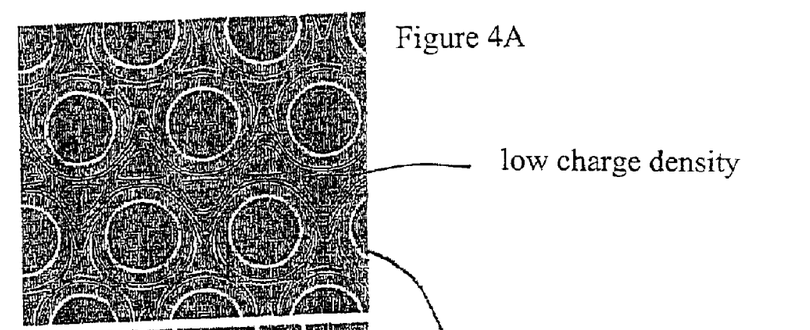
FIGS. 4A and 4B represent charge density, top (x=1, FIG. 4A) and bottom (x=0, FIG. 4B), of a $Li_xNiO_2$ crystal structure.
Figure 4B:
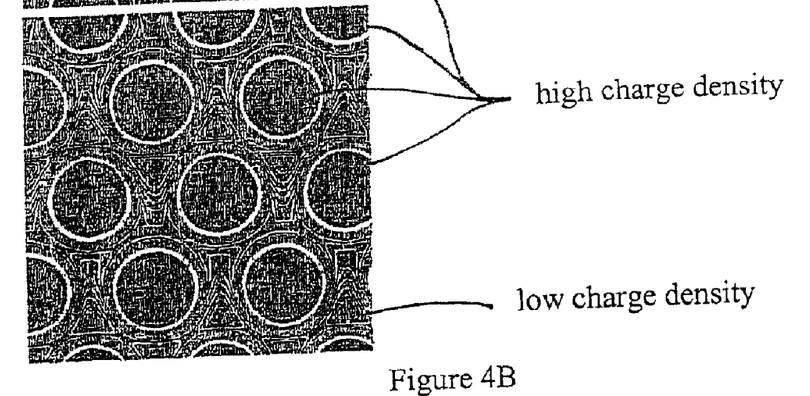

A quantum mechanical approach has been used to support the statements just made. FIG. 4A depicts the charge density (i.e. chemical bonding of the structure) in the oxygen layer of a $LiNiO_2$ crystal, while in FIG. 4B the charge density of a nickel oxide crystal is presented when all Li ions are removed from the structure.

Figure 5:
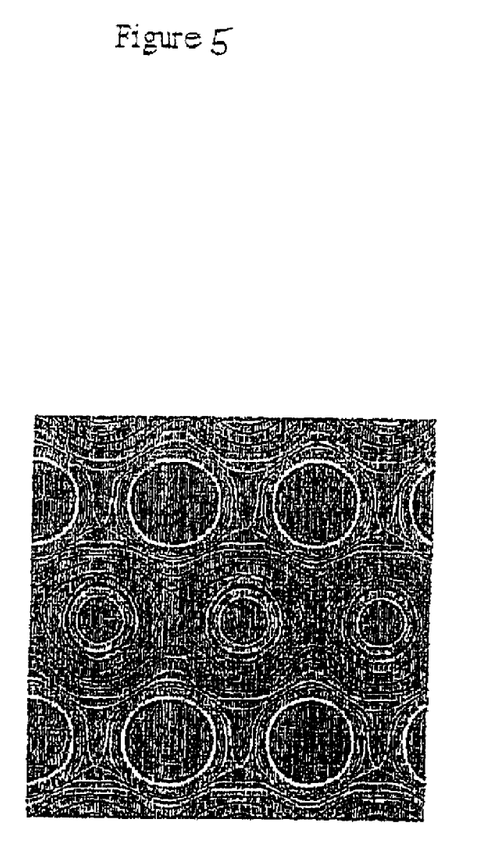
FIG. 5 is a representation of charge density in the metallic planes of $Li_xNiO_2$ for x=1.
Figure 6:
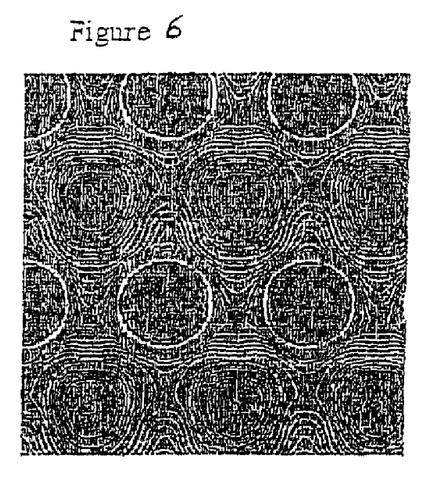
FIG. 6 is a representation of charge density in metallic planes for $Li_xNiO_2$ for x=0.

The charge density of $Li_xNiO_2$ in (012) metal planes is presented in FIG. 5 for x=1, and in FIG. 6 for x=0. The top part of FIG. 5 shows rows of Li atoms (smaller circles) and Ni atoms (larger circles). Li atoms do not have any covalent bonding with their nearest neighbors; they are surrounded by very low-density charge regions. This means that Li is fully donating its valence electron to the crystal and ionically interacts with other atoms. On the contrary, Ni atoms create strong covalent bonds in their respective row, as is also seen in the FIG. 5. For x=1, the Ni—Ni interaction between different rows is negligible, screened completely by Li-ions.

When Li is removed from the structure, as shown in FIG. 6, the picture changes drastically. Ni—Ni interaction is created between the Ni rows in the (012) planes. These metal-metal bonds are responsible for Ni disorder being created, (i.e., i) disorder when Ni tends to diffuse into Li site; ii) additional attractive interaction (Ni—Ni), which ultimately leads to the structural collapse). Therefore, a certain amount of "shielding" atoms has to be preserved in the structure to limit the process of creation of such bonds on the level above which the structural collapse occurs. This is the reason for introducing other atoms than Li (A atoms) in the novel compounds. These atoms stabilize the crystal, as they are normally not removed during cycling.

Shielding is achieved through doping of Li sites by "less mobile" ions, possibly with larger ionic radii.

Figure 7:
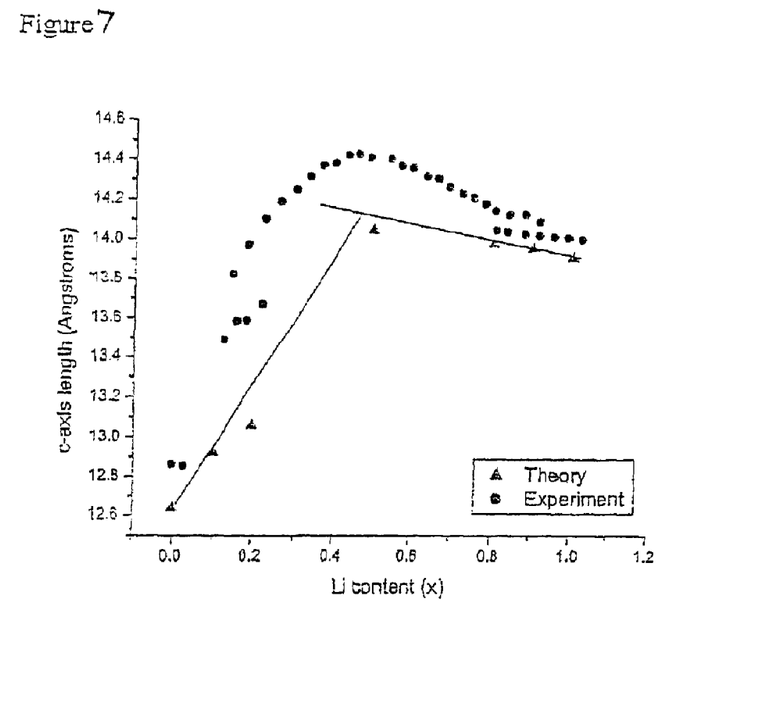
FIG. 7 is a plot of c-axis length versus lithium content (x) in $LiCoO_x$ as determined theoretically, and as identified by experiment.
Figure 8:
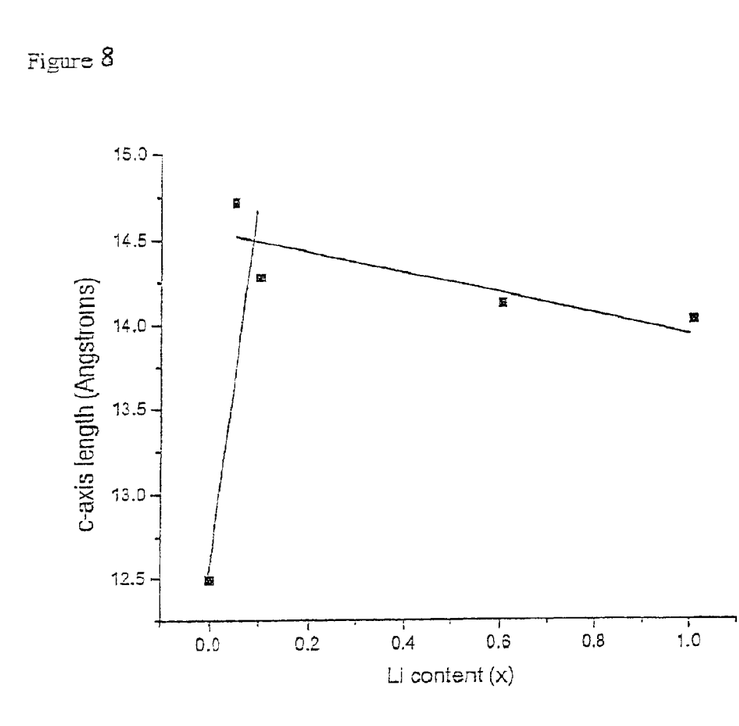
FIG. 8 is a plot of c-axis length versus lithium content (x) in $LiNiO_2$ as theoretically predicted.

The change in the c-axis length upon Li deintercalation has been modeled. The results for $Li_xCoO_2$ are presented in FIG. 7. A drastic change in the slope of the c(x) function takes place at around x=0.5, which coincides with the maximum degree of Li deintercalation from $LiCoO_2$. It is believed that this change shows the limit for stability in the crystal structure and determines the maximum capacity of a cathode material. In other words, the slope of the c(x) function in the low-x region is an indicator of relative capacity of a material, i.e. when this slope is larger, the "critical point" in x moves towards lower x values, indicating greater stability of a material. The c-axis change for $LiNiO_2$ also was modeled, and is shown in FIG. 8. The change in the slope of c(x) for $LiNiO_2$ takes place at much lower values of x, indicating increased capacity due to the increased structural stability of $LiNiO_2$ as compared to $LiCoO_2$. The underlying physics behind this behavior is believed to be based on the fact that Ni has one electron more than Co. This additional electron occupies so-called antibonding states, which counteract the tendency to collapse the structure by Ni—Ni bonds, shown in FIG. 5. This feature is used as a rationale for doping with B atoms. It is believed that doping of B atoms into Ni sites lowers the number of electrons that are occupying antibonding orbitals, thereby improving safety due to the dilution of Ni atoms. However, due to the compromised capacity, "A" atoms are used to further stabilize the structure, thereby allowing relatively high capacity while maintaining safety. Further, due to the increased structural stability, cyclability typically is high.

Figure 9:
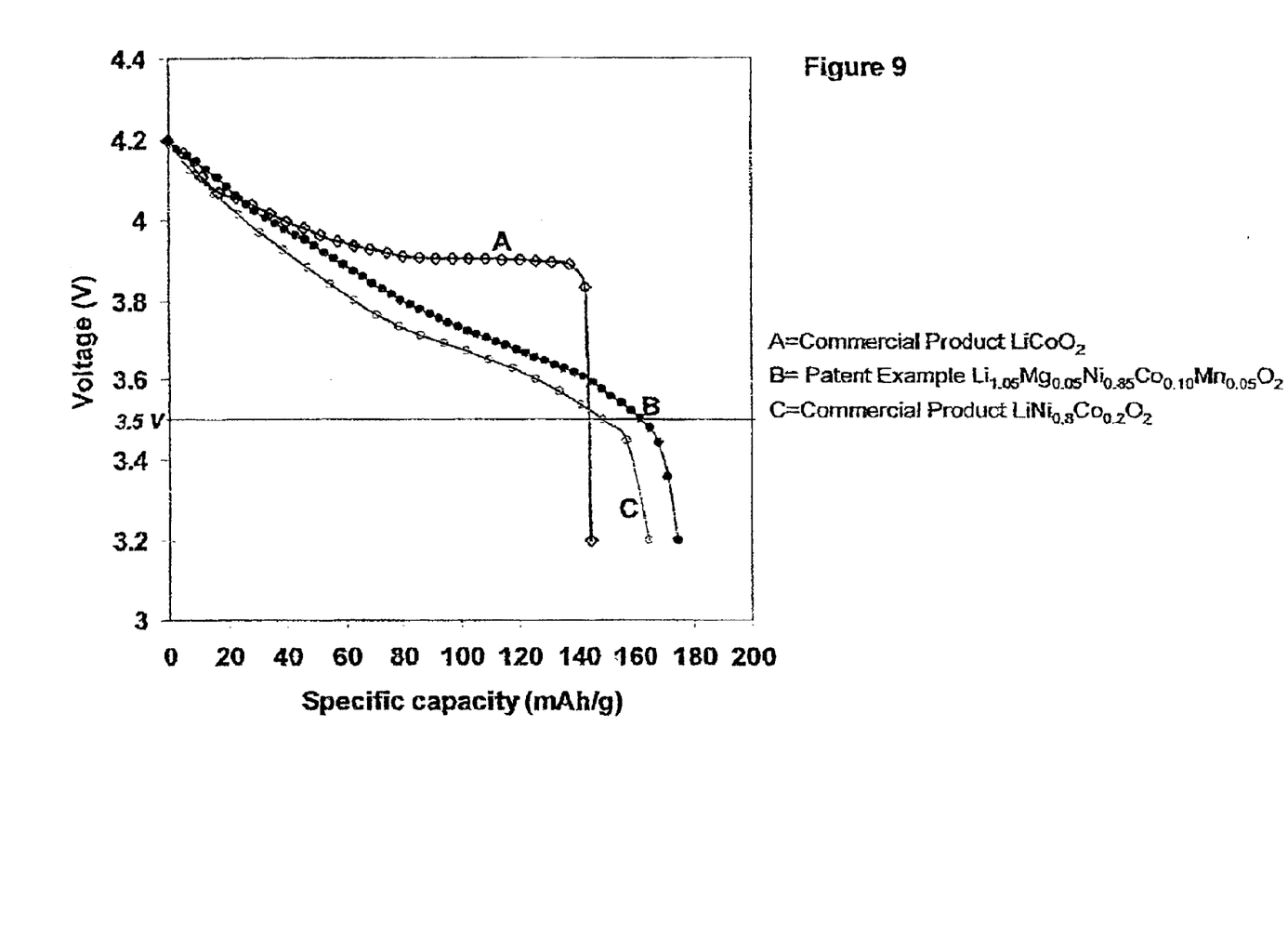
FIG. 9 is a plot of voltage (V) versus specific capacity (mAh/g), identified as polarization curves of three materials: $LiCoO_2$, $LiNi_{0.8}Co_{0.2}O_2$ and $Li_{1.05}Mg_{0.05}Ni_{0.85}Co_{0.1}Mn_{0.05}O_2$.

During discharge, polarization of an active cathode material is especially important. For instance, in cellular telephones, most electronics has traditionally stopped working at voltages below 3.5 V. For this application it is important that as much capacity as possible is available above this limit. FIG. 9 shows a polarization comparison between $LiCoO_2$ and $LiNi_{0.8}Co_{0.2}O_2$ oxide materials. As can be seen from FIG. 9, the total capacity of the $LiNi_{0.8}Co_{0.2}O_2$ material is higher if the cell is allowed to discharge below 3.5 V. However, if 3.5 V is the cut-off voltage during discharge, $LiCoO_2$ would have a better capacity. This feature also is addressed in the current invention. We have found certain dopants to increase voltage during discharge. Elements that will positively influence the voltage profile when dopes on the 3b site ("B" atoms) are among the preferred elements. Element that increase polarization compared to pure $LiNiO_2$ oxide when substituted on the 3b site are boron, aluminum, gallium and cobalt. Two transition metals, manganese and vanadium, have a very slight decrease in polarization, but exhibit a good effect on safety properties, while high capacity can be maintained if low substitution levels are used.

The invention now will be further and specifically described by the following examples, which are not intended to be limiting. All parts and percentages are by weight unless specified otherwise.

EXAMPLE 1

Synthesis of $Li_{1.05}Mg_{0.05}Ni_{0.87}Co_{0.1}Mn_{0.03}O_2$ 24.35 g $LiNO_3$, 0.98 g $Mg(OH)_2$, 27.13 g $Ni(OH)_2$, 3.13 g $Co(OH)_2$ and 0.72 g MnO were placed in a Retsch/Brinkmann mortar grinder (model RM100) fitted with agate mortar and pestle and ground for 5 minutes. The resultant homogeneous powder was placed in an alumina combustion tray and sintered in a Degussa-Ney muffle furnace (model 3-1750), under the following profile: ramp 5° C./minute to 450° C., hold at 450° C. for 4 hours, ramp 2° C./minute to 750° C., hold at 750° C. for 4 hours. The sample was allowed to cool naturally to room temperature and then ground 5 minutes in the mortar grinder to attain a particle size range of 1–50 μm. When subjected to XRD there were no impurities noted. The lattice parameters were a=2.8744 (4) Å and c=14.195(1) Å. Electrochemical measurements of this powder yielded a specific capacity at C/8 of 163 mAh/g with a $1^{st}$ cycle efficiency of 84%, and a gassing volume of 6.7 cc/g. This shows that a high capacity is obtained at the same time as low gassing volumes are present, compared to comparable example 2.

EXAMPLE 2

Synthesis of $LiMg_{0.01}Ni_{0.87}Co_{0.08}Mn_{0.05}O_2$ 73.83 g $LiNO_3$ (excess Lithium was used), 0.59 g Mg(OH)2, 29.69 g $Co(OH)_2$, and 5.86 g MnCO3 were mixed 5 minutes in a Retsch/Brinkmann mortar grinder (model RM100) fitted with an agate mortar and pestle. The mixed materials were added to a 1L high density polyethylene jar containing 82.25 g Ni(OH)2 and mixed by shaking. The homogeneous precursor powders are placed in an alumina crucible, and sintered under air using the following heating profile: ramp 5° C./minute to 450° C., hold at 450° C. for 4 hours, ramp 2° C./minute to 775° C., and hold for 24 hours. The sample was then allowed to cool naturally to room temperature and ground for 5 minutes to break up agglomerates. When subjected to XRD this material was shown to be the phase pure rhombohedral structure of α-NaFeO$_2$-type with no detectable impurities.

EXAMPLE 3

Synthesis of LiMg$_{0.03}$Ni$_{0.87}$Co$_{0.10}$Mn$_{0.03}$O$_2$ 74.7 g LiNO$_3$ (excess Lithium was used), 1.77 g Mg(OH)2, 8.13 g Co$_3$O$_4$, and 3.49 g MnCO3 were mixed 5 minutes in a Retsch/Brinkmann mortar grinder (model RM100) fitted with an agate mortar and pestle. The mixed materials were added to a 1L high density polyethylene jar containing 65.79 g NiO and mixed by shaking. The homogeneously mixed precursor powders are placed in an alumina crucible, and sintered under air using the following heating profile: ramp 5° C. /minute to 450° C., hold at 450° C. for 4 hours, ramp 2° C./minute to 850° C., and hold for 6 hours. The sample was then allowed to cool naturally to room temperature and ground for 5 minutes to break up agglomerates. A second calcination procedure, using the same heating profile as the first calcination, was then applied. When subjected to XRD this material was shown to contain the phase pure rhombohedral structure with no detectable impurities.

COMPARATIVE EXAMPLE 1

Synthesis of Li$_{1.1}$Ni$_{0.09}$Co$_{0.1}$O$_2$ 25.9 g of LiNO$_3$, 28.3 g Ni(OH)$_2$ and 3.2 g Co(OH)$_2$ were placed in a Retsch/Brinkmann mortar grinder (model RM100) fitted with agate mortar and pestle and ground for 5 minutes. The resultant homogeneous powder was placed in an alumina combustion tray, and sintered in a Degussa-Ney muffle furnace (model 3-1750), under the following profile: ramp 5° C./minute to 450° C., hold at 450° C. for 4 hours, ramp 2° C./minute to 750° C., hold at 750° C. for 4 hours. The sample was allowed to cool naturally to room temperature and then ground 5 minutes in the mortar grinder to attain a particle size range of 1–50 μm. When subject to XRD this material was shown to have no visible impurities. The lattice parameters were a=2.8716(3) Å and c=14.1800(9) Å. Electrochemical measurements of this powder yielded a specific capacity at C/8 of 195 mAh/g with a 1$^{st}$ cycle efficiency of 87%, and a gassing volume of 18.2 cc/g. This shows that this material has unacceptably high gassing properties.

COMPARATIVE EXAMPLE 2

Synthesis of Li$_{1.1}$Ni$_{0.87}$Co$_{0.1}$Mn$_{0.03}$O$_2$ 25.73 g LiNO$_3$, 27.37 g Ni(OH)$_2$, 3.15 g Co(OH)$_2$ and 0.72 g MnO were placed in a Retsch/Brinkmann mortar grinder (model RM100) fitted with agate mortar and pestle and ground for 5 minutes. The resultant homogeneous powder was placed in an alumina combustion tray, and sintered in a Degussa-Ney muffle furnace (model 3-1750), under the following profile: ramp 5° C./minute to 450° C., hold at 450° C. for 4 hours, ramp 2° C./minute to 750° Ch, hold at 750° C. for 4 hours. The sample was allowed to cool naturally to room temperature and then ground 5 minutes in the mortar grinder to attain a particle size range of 1–50 μm. When subjected to XRD this material was shown to have no visible impurities. The lattice parameters were a=2.8729(3) Å and c=14.184(1) Å. Electrochemical measurements of this powder yielded a specific capacity at C/8 of 181 mAh/g with a 1$^{st}$ cycle efficiency of 87%, and a gassing volume of 25.4 cc/g. This shows that it is not enough to substitute manganese only to obtain low gassing volumes. This material has high capacity, but also high gassing volumes.

COMPARATIVE EXAMPLE 3

Synthesis of LiNi$_{0.90}$Co$_{0.05}$Mn$_{0.05}$O$_2$ 77.27 g LiNO$_3$ (excess Lithium was used), 4.74 g Co(OH)$_2$, and 5.86 g MnCO$_3$ were mixed 5 minutes in a Retsch/Brinkmann mortar grinder (model RM100) fitted with an agate mortar and pestle. The mixed materials were added to a 1L high density polyethylene jar containing 85.02 g Ni(OH)2 and mixed by shaking. The homogeneous precursor powders are placed in an alumina crucible, and sintered under air using the following heating profile: ramp 5° C. /minute to 450° C., hold at 450° C. for 4 hours, ramp 2° C./minute to 775° C., and hold for 24 hours. The sample was then allowed to cool naturally to room temperature and ground for 5 minutes to break up agglomerates. When subjected to XRD this material was shown to be phase pure with no visible impurities. Cycling tests showed that the capacity at the 50$^{th}$ cycle was at 59% of initial capacity. This can be compared to the compound in Example 1, which was at 71% after 50 cycles. This showed that the compound in Example 1 had superior cyclability.

COMPARATIVE EXAMPLE 4

Synthesis of LiNi$_{0.87}$Co$_{0.1}$B$_{0.03}$O$_2$

19.56 g LiNO$_3$ (excess Lithium was used), 20.81 g Ni(OH)$_2$, 2.40 g Co(OH)$_2$ and 0.27 g B$_2$O$_3$ were placed in a Retsch/Brinkmann mortar grinder (model RM100) fitted with agate mortar and pestle and ground for 5 minutes. The resultant homogeneous powder was placed in an alumina combustion tray, and sintered under air in a Degussa-Ney muffle furnace (model 3-1750), under the following profile: ramp 5° C. /minute to 450° C., hold at 450° C. for 4 hours, ramp 2° C./minute to 750° C., hold at 750° C. for 4 hours. The sample was allowed to cool naturally to room temperature and then ground 5 minutes in the mortar grinder. When subjected to XRD this material was shown to be phase pure with no visible impurities. Cycling tests showed that the capacity at the 50$^{th}$ cycle was at 40% of initial capacity. This can be compared to the compound in Example 1, which was at 71% after 50 cycles. This showed that the compound in Example 1 had superior cyclability.

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. A lithium battery, comprising a cathode that includes a composition having an empirical formula $$Li_{x1}A_{x2}Ni_{1-y-z}Co_yB_zO_a,$$

wherein: x1 is greater than about 0.1 and equal to or less than about 1.3, x2 is greater than about 0.0 and equal to or less than about 0.2, y is greater than about 0.0 and equal to or less than about 0.2, z is greater than about 0.0 and equal to or less than about 0.2, a is greater than about 1.5 and less than about 2.1, A is at least one element selected from the group consisting of barium, magnesium, calcium and strontium, and B is at least one element selected from the group consisting of boron, aluminum, gallium, manganese, titanium, vanadium and zirconium, and wherein the A atoms substitute for Li atoms and the Co and B atoms substitute for Ni atoms of the structure of $LiNiO_2$.

2. A cathode, comprising a composition having an empirical formula $$Li_{x1}A_{x2}Ni_{1-y-z}Co_yB_zO_a,$$

wherein: x1 is greater than about 0.1 and equal to or less than about 1.3, x2 is greater than about 0.0 and equal to or less than about 0.2, y is greater than about 0.0 and equal to or less than about 0.2, z is greater than about 0.0 and equal to or less than about 0.2, a is greater than about 1.5 and less than about 2.1, A is at least one element selected from the group consisting of barium, magnesium, calcium and strontium, and B is at least one element selected from the group consisting of boron, aluminum, gallium, manganese, titanium, vanadium and zirconium, and wherein the A atoms substitute for Li atoms and the Co and B atoms substitute for Ni atoms of the structure of $LiNiO_2$.

3. The cathode of claim 2, where A is magnesium and B is manganese.

4. The cathode of claim 2, further including a polymeric binder.

5. The cathode of claim 4, wherein the polymeric binder is selected from the group consisting of polytetrafluoroethylene, polyvinylidene fluoride and styrene-butadiene rubber.

6. The cathode of claim 3, further including at least one of carbon black and graphite.

7. A cathode, comprising a composition having an empirical formula $$Li_{x1}A_{x2}Ni_{1-y-z}Co_yB_zO_a,$$

wherein: x1 is greater than about 0.1 and equal to or less than about 1.3, x2 is greater than about 0.0 and equal to or less than about 0.2, y is greater than about 0.0 and equal to or less than about 0.2, z is greater than about 0.0 and equal to or less than about 0.2, a is greater than about 1.5 and less than about 2.1, A is magnesium and B is manganese.

8. The cathode of claim 7, further including a polymeric binder is selected from the group consisting of polytetrafluoroethylene, polyvinylidene fluoride and styrene-butadiene rubber.

9. The cathode of claim 8, further including at least one of carbon black and graphite.

* * * * *

UNITED STATES PATENT AND TRADEMARK OFFICE
CERTIFICATE OF CORRECTION

PATENT NO. : 6,855,461 B2
DATED : February 15, 2005
INVENTOR(S) : Christina Lampe-Onnerud et al.

It is certified that error appears in the above-identified patent and that said Letters Patent is hereby corrected as shown below:

Title page,
Item [75], Inventor, please delete "Richard Chamberlain" and insert -- Richard V. Chamberlain, II --

Column 12,
Line 30, please delete "is".

Signed and Sealed this

Seventeenth Day of May, 2005

JON W. DUDAS
*Director of the United States Patent and Trademark Office*